Oct. 19, 1937.　　　　F. T. KREIN　　　　2,096,552
METHOD OF AND APPARATUS FOR PACKAGING AND DISPENSING FROZEN CONFECTIONS
Filed March 14, 1934　　　2 Sheets-Sheet 1
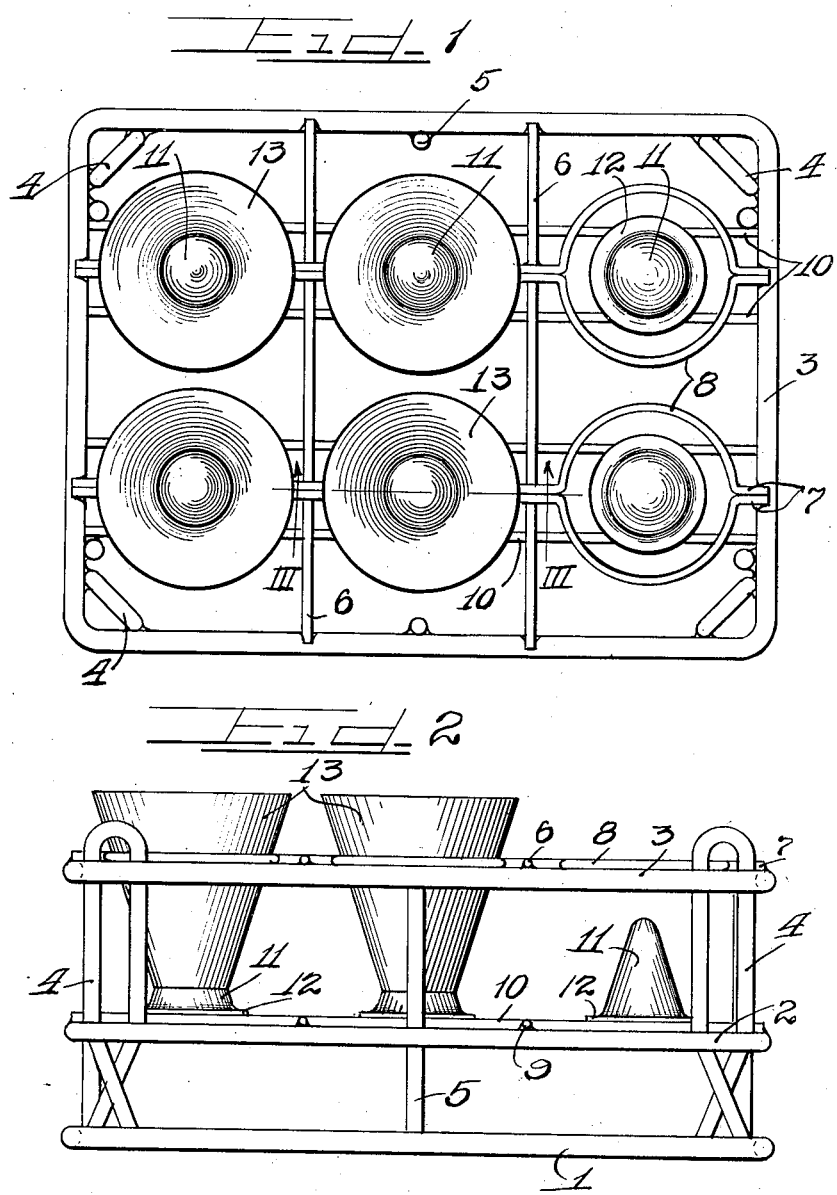

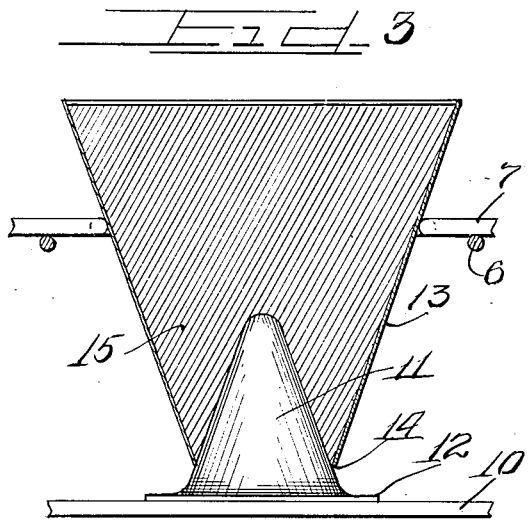
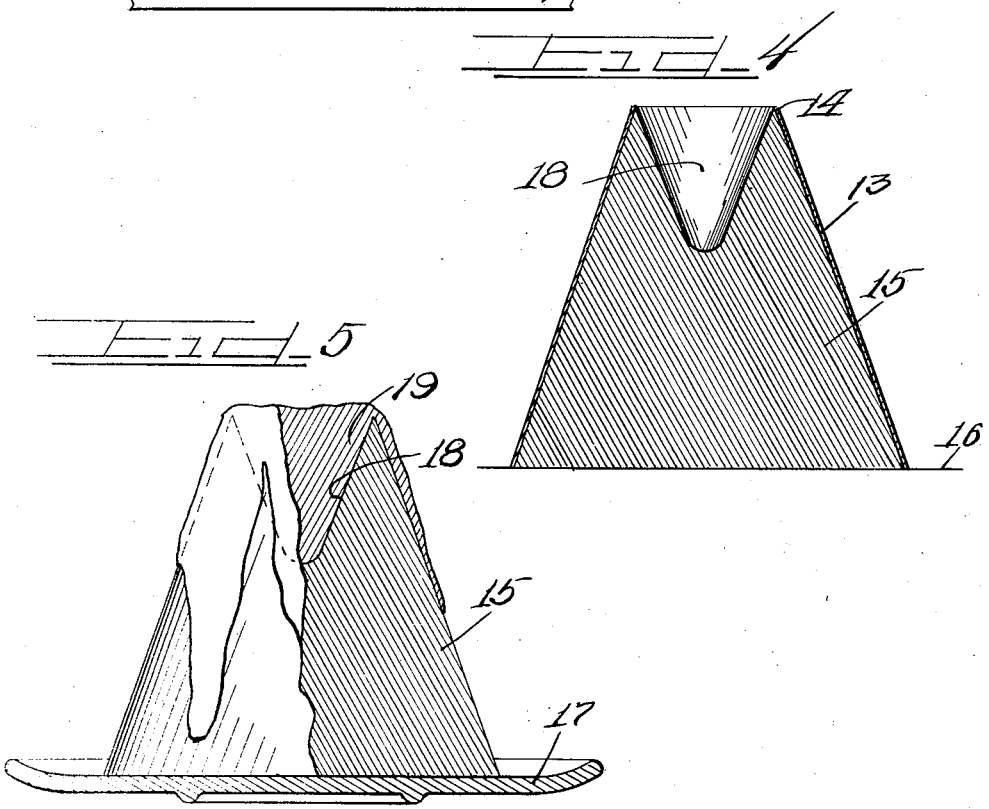

Patented Oct. 19, 1937

2,096,552

UNITED STATES PATENT OFFICE 2,096,552

METHOD OF AND APPARATUS FOR PACKAGING AND DISPENSING FROZEN CONFECTIONS

Frederick Thomas Krein, Park Ridge, Ill., assignor to Dixie-Vortex Company, a corporation of Delaware Application March 14, 1934, Serial No. 715,426

8 Claims. (Cl. 107—54)

The present invention relates to improvements in a method of packaging and dispensing frozen confections, such as ice creams, sherbets, and the like, and also to apparatus for packaging such confections, although the invention may have other uses and purposes as will be apparent to one skilled in the art.

In the retail dispensing of frozen confections, such as ice cream and the like, it has been found advantageous to dispense individual portions of the confection in individual containers, removing the container at the time the confection is served to the purchaser. This system insures that each purchaser receives the same amount of confection as does every other purchaser, and receives the confection in a wholly sanitary manner. Furthermore, such a system eliminates the loss to the retail merchant commonly prevalent when ice cream is dispensed from a bulk container. Temporary containers, such as paper cups, have been found highly desirable for dispensing frozen confections in individual portions, and conical cups have been found advantageous for dispensing individual portions for ice cream cones, while, for sodas, it does not matter particularly what shape the portion of ice cream may have. However, some of the shapes of the containers heretofore used have not been as highly desirable as may be demanded for the dispensing of frozen confections in forms for sundaes and other dishes.

Accordingly, it is an object of this invention to provide a new and novel method of packaging frozen confections in individual containers.

Another object of the invention is to provide a new and novel method of packaging a frozen confection wherein the confection may be contemporaneously frozen into a container and molded in a desired shaped suitable for use in a sundae.

A further object of this invention is the provision of a new and novel method of packaging and dispensing a frozen confection in forms for use as a sundae.

It is also an aim of this invention to provide a new and novel method of packaging, dispensing, or packaging and dispensing a complete sundae.

Still a further object of this invention is the provision of apparatus for packaging frozen confections in individual containers, said apparatus including means not only suitable for supporting a container during the freezing of the confection therein, but also for molding the confection contemporaneously with the freezing operation.

Still another object of the invention is the provision of apparatus for packaging frozen confections, including a tray or rack provided with a plurality of rests for confection containers, each rest being designed not only to support a container but also to mold an indentation in the confection within the container.

Also an object of the invention is the provision of apparatus for packaging and dispensing frozen confections including a pair of interfitting elements, one of the elements being a container for the confection, having an opening therein, and the other of the elements being a rest for the container designed to project through the opening and mold an indentation in the contents of the container.

While some of the more salient features, characteristics and advantages of the present invention have been above pointed out, others will become apparent from the following disclosures.

The invention includes these and other features of construction, combinations of parts, and process steps hereinafter described, and a preferred form of the structure and process being illustrated in the drawings, as more particularly indicated by the claims.

On the drawings:

Figure 1 is a plan view of an apparatus combining principles of the present invention, and which may be used to perform the method of this invention.

Figure 2 is a side elevational view of the structure shown in Figure 1.

Figure 3 is an enlarged fragmentary vertical sectional view taken substantially as indicated by the line III—III of Figure 1.

Figure 4 is a vertical sectional view of the confection container and its contents after a packaging operation is complete.

Figure 5 is a vertical sectional view illustrating the final step in the performance of the method embodied in this invention.

As shown on the drawings:

In the illustrated embodiment of this invention, with reference to Figures 1, 2 and 3, there is shown a tray or rack designed to hold a plurality of confection containers. This rack, of course, may be made of any desirable material and in substantially any desirable shape. In the present instance, the rack is shown as constructed of wire, with the exception of the container rests, mentioned more fully hereinafter. Each wire member of the rack is preferably soldered, brazed, welded or secured in any other desirable manner to another wire member at every point of contact between wire members in the rack.

As shown, the rack includes a base frame 1, an intermediate frame 2, and an upper frame 3, these frames all being in spaced relationship to each other and held fixedly in their relative positions by means of their corner supports 4 and side posts 5.

The upper frame 3 is provided with a substantially lattice-worked shelf including cross rods 6 having their ends deflected upwardly to rest on top of the frame 3. Disposed transversely across the rods 6 are a plurality of pairs of wires 7 also having their ends resting upon the frame 3. In each pair the wires 7 are disposed intimately side by side, but at suitable intervals, the wires are arced complementarily outwardly to form cup supporting loops 8, the wires being secured together adjacent their ends and intermediate the loops.

The intermediate frame 2 is also provided with a lattice-worked shelf including cross wires 9 similar to the cross wires 6. Disposed upon and transversely to the cross wires or rods 9 are a plurality of pairs of wires 10, the wires in each pair being in spaced relationship and extending parallel to each other. Mounted on each pair of cross wires 10 is a plurality of container rests 11, each being disposed in axial alignment with the respective cup supporting loop 8 disposed thereabove. Each cup rest 11 includes a base flange 12 and an upwardly projecting portion, preferably conical in shape. As is the case with the rack, the cup rests 11 are preferably formed of metal or some other suitable material of a contrasting nature to the material of the confection container hereinafter described.

The confection container shown in the present instance is in the form of a conical cup 13, preferably made of paper of the character used for paper drinking cups, although any other suitable material may be used. The container 13 is preferably conical in shape so that the frozen confection, when dispensed, will have sloping side walls, as seen better in Figure 5, permitting a flavoring medium to gravitate over these walls in a manner providing a more palatable dish. The container does not form a complete cone, but is truncated so as to leave an opening 14 in the bottom thereof through which a cup rest 11 may project in order to mold a corresponding indentation in the contents of the container.

In practicing the present invention, a plurality of containers or cups 13 are disposed in the rack, with the large end of the container uppermost, each container seating upon a rest 11 and being supported in such position by the corresponding supporting loop 8. As seen more clearly in Figure 3, the conical portion of a rest 11 projects upwardly through the aperture 14 into the interior of its respective container, and the aperture and rest are so proportioned in size that the edges of the opening 14 in the container intimately engage the conical walls of the projection on the rest above the flange 12.

After the containers have been so positioned on the rests, each container is filled in any suitable manner with a confectionery mass in a semi-hardened or partially frozen condition. With the confectionery mass in such a state, any leakage that may occur through the opening 14 in the lower end of the container will be negligible.

This confectionery mass, designated 15 in Figures 3, 4 and 5, is next subjected to a freezing or congealing operation, depending upon the nature of the mass. The freezing or hardening operation, of course, causes the mass 15 to assume a condition of rigidity which is maintained as long as the temperature is kept sufficiently low, and also causes the mass 15 to unite with the container 13.

The chilling or freezing operation, in most cases, also causes the confectionery mass 15 to adhere to the conical projection of the cup rest 11, and after this chilling operation a smooth surface member, designated diagrammatically in Figure 4 by numeral 16, may be placed over the upper surfaces of all the containers and the entire structure including the rack, inverted upon the smooth surface member. If, due to the adhesion of the confectionery masses to the cup rests, the rack cannot be lifted from the packaged confections, heat may be applied to the cup rests 11 just sufficiently to cause a slight melting of the confection adjacent the rests so that the rack may be lifted from the packaged confections.

In one course of business, the packaged confections are next packed in a suitable refrigerating container and distributed to the retail dealers. Upon the request of a purchaser for a sundae, the dealer removes one of the packaged confections from the refrigerating device, places the confection upon a suitable serving member 17 (Figure 5), with the indentation 18 formed by the cup rest uppermost, and strips the container or wrapper 13 from the confection in any suitable manner such as separating the margins of the container. The dealer next pours a suitable flavoring medium, such as syrup, crushed fruits, or the like, into the aperture 18 to formulate a sundae. It will be noted that with the aperture 18 of a proper size relative to the confection 15, a very slight melting of the confection will insure the flavoring medium 19 gravitating down the sides of the mass of the confection in a manner to render the dish more palatable. In many cases, the aperture 18 can also be so sized as to form a gauge for the proper amount of flavoring medium.

The present invention also lends itself to the formation of complete packaged sundaes. To this end, after the confections are in inverted position, as seen in Figure 4, and the rack has been removed, a flavoring medium may be poured into the indentation 18, and the confection subjected to another chilling action operation to freeze or congeal the flavoring medium. When the confection is then dispensed in the manner above described by the retail dealer, the sundae is already formed, and upon a slight melting of the confection and the flavoring medium, the flavoring medium will gravitate over the sides of the confection as above described.

The present invention is, of course, susceptible to variations in the apparatus employed and in the steps of the method above outlined, without in fact departing from the principles and spirit of the invention. For example, the container 13 need not of necessity be of the shape of a truncated cone, and the container rest 11 need not of necessity be conical in form. In other instances, it might be deemed feasible to lift the container and confection out of the rack individually rather than invert the rack and discharge a plurality of containers after the chilling operation. It might also be deemed preferable in certain cases, depending upon the particular consistency of the confectionery mass, to invert the apparatus and remove the rack prior to the chilling or freezing operation. In this latter event, the flavoring medium could be poured into the indentation in the partially hardened mass and frozen or congealed together with the confectionery mass.

From the foregoing, it will be apparent that I have provided a method of packaging and dispensing frozen confections, together with apparatus for so doing that may be performed in a rapid and economical manner. It will also be apparent that the frozen confection may be packaged and dispensed in form for use in a sundae, or in complete sundae form without any extra operations with the exception of the applying of the flavoring medium. The apparatus lends itself to a quick and economic performance of the method, and the apparatus is extremely simple in construction, easy to manipulate, durable, and economical to manufacture and use.

I claim as my invention:

1. The process of packaging and dispensing a frozen confection in sundae form, consisting of freezing a mass of confection in a container having converging side walls, contemporaneously molding an indentation in the confection mass at a narrow point between said converging walls and substantially of the width of the confection mass at this point, filling the indentation with a flavoring medium and congealing the medium, and subsequently placing the container and its contents on a serving member, with the flavoring medium uppermost, and removing the container permitting the flavoring medium to run down the sloping walls of the confection mass as the confection begins to melt.

2. The process of forming and packaging a confection in sundae form, including molding a confectionery mass into substantially frusto-conical form in a container of a form for ultimate distribution, molding an indentation in the mass inwardly from the smaller end thereof and of a size substantially equal in cross-sectional area to said smaller end, filling said indentation with a flavoring medium, and hardening the mass and flavoring medium causing the mass to adhere to the container.

3. Apparatus for packaging frozen confections of the type wherein a confection is frozen in and to a container, including a tray formed of bent relatively thin metallic members shaped to provide an upper deck with a plurality of cup socket formations, a lower deck, a plurality of conical projections on said lower deck in alignment with said sockets to extend through the bottom of a cup and intimately engage the lower edge of the cup and form a seat limiting the downward movement of the cup.

4. Apparatus for packaging frozen confections of the type wherein a confection is frozen in and to a container, including a tray formed of bent relatively thin metallic members shaped to provide an upper deck with a plurality of cup socket formations, a lower deck, a plurality of conical projections on said lower deck in alignment with said sockets to extend through the bottom of a cup and intimately engage the lower edge of the cup and form a seat limiting the downward movement of the cup, said tray being formed openly on all sides of a cup positioned therein except for said sockets and projections for free circulation of air blasts to freeze the contents of the container.

5. Apparatus for packaging frozen confections in containers, including a rack formed of bent metallic strips shaped to provide an upper deck having container receiving sockets therein, a lower deck, and a plurality of forming members in alignment with said sockets, said members each being shaped to project through a container and mold an indentation in the contents of a container as well as function as a seat for the container.

6. Apparatus for packaging frozen confections in containers, including a rack having an upper deck and a lower deck, said upper deck having openings therein to function as sockets for containers to be filled, and a plurality of forming members on said lower deck each in alignment with a socket and shaped to mold an indentation in the contents of the container as well as function as a seat for the container.

7. In the process of packaging a frozen confection in the form of a sundae by using a tubular paper wrapper having both ends open and a mold in one end, the steps of filling the wrapper through one of the openings with a plastic mass of confection, forming an indentation at the other and mold opening in the mass disposed in the wrapper, and freezing the confectionery mass as thus formed to the wrapper while employing the wrapper as a supporting and shaping medium.

8. The process of forming and packaging a confection in sundae form, including molding a confectionery mass into substantially frusto-conical form in a container of a form for ultimate distribution, molding an indentation in the mass inwardly from the smaller end thereof and of a size substantially equal in cross-sectional area to said smaller end, and hardening the mass, causing the mass to adhere to the container.

FREDERICK THOMAS KREIN.